(12) United States Patent
Wold et al.

(10) Patent No.: US 7,883,112 B2
(45) Date of Patent: Feb. 8, 2011

(54) TEXTILE GAS GUIDE FOR INFLATABLE CURTAIN

(75) Inventors: Dana Wold, Farmington Hills, MI (US); James E. Nelson, Salt Lake City, UT (US); Brian Czach, Shelby Township, MI (US); Mark S. Hatfield, Providence, UT (US)

(73) Assignee: Autoliv ASP, Inc., Ogden, UT (US)

( * ) Notice: Subject to any disclaimer, the term of this patent is extended or adjusted under 35 U.S.C. 154(b) by 206 days.

(21) Appl. No.: 12/154,751

(22) Filed: May 27, 2008

(65) Prior Publication Data

US 2009/0295134 A1    Dec. 3, 2009

(51) Int. Cl.
 *B60R 21/16*    (2006.01)
(52) U.S. Cl. .................................... 280/743.1
(58) Field of Classification Search ................. 280/741, 280/743.1, 730.2; 156/93
 See application file for complete search history.

(56) References Cited

U.S. PATENT DOCUMENTS

| | | | |
|---|---|---|---|
| 5,087,071 A * | 2/1992 | Wallner et al. ........... | 280/743.1 |
| 5,743,560 A | 4/1998 | Jackson et al. | |
| 5,778,270 A | 8/1998 | Håland et al. | |
| 6,712,920 B2 | 3/2004 | Masuda et al. | |
| 6,848,708 B2 | 2/2005 | Green et al. | |
| 7,264,268 B2 | 9/2007 | Ehrke | |
| 2005/0269806 A1 | 12/2005 | Huber et al. | |
| 2008/0224457 A1* | 9/2008 | Brough et al. ........... | 280/730.2 |
| 2010/0084841 A1* | 4/2010 | Suemitsu et al. ......... | 280/730.2 |

FOREIGN PATENT DOCUMENTS

| | | |
|---|---|---|
| DE | 10 2004 006 317 B4 | 9/2005 |
| JP | 2009083552 A * | 4/2009 |
| WO | WO-2005/076687 A2 | 8/2005 |
| WO | WO 2006/092226 A2 | 9/2006 |

* cited by examiner

*Primary Examiner*—Faye M. Fleming
(74) *Attorney, Agent, or Firm*—Sally J Brown; Madison IP, P.C.

(57) ABSTRACT

A textile gas guide may include a fabric member which may include an obverse side, a reverse side, a leading edge, and a trailing edge. The fabric member may overlap upon itself at least once such that at least a portion of the obverse side adjacent the leading edge may be disposed to align with at least a portion of the reverse side adjacent the trailing edge to define an overlapping region. A first seam may be sewn through the overlapping region, the first seam being in shear stress when the airbag module is inflated. An airbag module may include the above textile gas guide and an airbag cushion including an inflation throat. At least a portion of the textile gas guide may be located within the inflation throat. An inflator may be inserted into the textile gas guide.

19 Claims, 16 Drawing Sheets

TEXTILE GAS GUIDE FOR INFLATABLE CURTAIN

TECHNICAL FIELD

The present invention relates to textile gas guides for inflatable curtains. More specifically, the present invention relates to methods of manufacturing textile gas guides that reduces the likelihood that the seam of the textile gas guides will fail during deployment.

BACKGROUND OF THE INVENTION

The inclusion of inflatable safety restraint devices, or airbags, is now a legal requirement for many new vehicles. Airbags are typically installed in the steering wheel dashboard, and at other positions in the vehicle. In the event of an accident, an accelerometer within the vehicle measures the abnormal deceleration and triggers the expulsion of rapidly expanding gases from an inflator. The expanding gases fill the airbags, which immediately inflate in front of the driver and passenger to protect them from impact against the windshield, dashboard, or other surfaces of the vehicle interior. Side impact airbags, known as inflatable curtains, have also been developed in response to the need for protection from impacts in a lateral direction, or against the side of the vehicle.

Conventional inflatable curtains often use a rigid "gas guide," such as made from metal or plastic, to direct gas from the inflator to the airbag cushion. The gas guide is a tube or other gas channel that directs the flow of the gas. The gas guide is manufactured separate from the airbag cushion and, thus, increases tooling and equipment costs associated with the overall cost of the inflatable curtain. The rigid gas guide also increases the weight of the airbag unit.

Textile gas guides have also been developed. Known textile gas guides are typically folded piece of material that is sewn along the edge to create a channel for the inflation gas. FIGS. 1A-2D illustrate previously known textile gas guides.

FIG. 1A illustrates a layout view of an unsewn, previously known textile gas guide. The gas guide 20 is referred to as a "midfill" gas guide. The gas guide 20 has sides 20a and 20b. Side 20a is folded over onto side 20b along fold line 22. FIG. 1B illustrates sew seam 24 used to create an outside edge of textile gas guide 20. Textile gas guide 20 also includes sew seam 26 and sew seams 27a, 27b, and 27c. Sew seams 27a, 27b, and 27c may be stitches that break. In other embodiments, the seams may be used to support a rigid gas guide (not shown) that may be finserted into the textile gas guide 20. The sew seams 27a, 27b, 27c receive this metal gas guide.

FIGS. 1C and 1D illustrates a cross-sectional slice taken along the line 1C-1C of FIG. 1B. FIG. 1C illustrates textile gas guide 20 in an uninflated state. FIG. 1D illustrates textile gas guide 20 in a hypothetical inflated state as if a rigid gas guide were not present. As textile gas guide 20 fills with gas during deployment, sides 20a and 20b attempt to separate and sew seam 24 is placed under tensile stress. This tensile stress (peel stress) is shown with arrow 23. If sew seam 24 were exposed to the full pressure and flow of an inflator, sew seam 24 may fail under the tensile stress.

FIG. 2A illustrates a layout view of an unsewn, previously known textile gas guide 40 having sides 40a and 40b and flaps 40c and 40d. The gas guide 40 can be an "endfill" gas guide or a "centerfill" gas guide. Side 40a is folded over on side 40b along fold line 42. Flaps 40c and 40d are folded over onto side 40a along fold lines 43a and 43b to create a double folded edge. FIG. 2B illustrates sew seam 44 that creates an outside edge of textile gas guide 40. Textile gas guide 40 also includes sew seam 46. FIGS. 2C and 2D illustrates a cross-sectional slice taken along the line 2C-2C of FIG. 2B. FIG. 2C illustrates textile gas guide 40 in an uninflated state. FIG. 2D illustrates textile gas guide 40 in a hypothetical inflated state as if a rigid gas guide were not present. As textile gas guide 40 fills with gas during inflation, sides 40a and 40b attempt to separate and sew seam 44 is placed under tensile stress. This tensile stress is shown with arrow 23. If sew seam 44 were exposed to the full pressure and flow of an inflator, sew seam 44 may fail under the tensile stress.

Because of the tensile stress 23 that may cause the seams to fail, textile gas guides are often supplemented with a rigid gas guide. The inclusion of this rigid gas guide increases the costs of the airbag system.

Thus, a new type of textile gas guide is needed. Such textile gas guides are disclosed and claimed herein.

BRIEF SUMMARY OF THE INVENTION

The devices and methods of the present invention have been developed in response to the present state-of-the-art, and, in particular, in response to problems and needs in the art that have not yet been fully resolved by currently available textile gas guides. The present invention provides devices for enhancing the effectiveness of airbag modules. To achieve the foregoing, and in accordance with the invention as embodied and broadly described in the preferred embodiments, textile gas guides are disclosed that do not require a rigid gas guide. These gas guides may be an endfill gas guide, a midfill gas guide, or a reverse fill gas guide. Additionally, textile gas guides are disclosed that may be mounted parallel to the top of an airbag cushion and that may be mounted along or beneath the top of an airbag cushion.

The textile gas guide may include a fabric member which may include an obverse side, a reverse side, a leading edge, a trailing edge, a first edge, and second edge. The fabric member may overlap upon itself at least once such that at least a portion of the obverse side adjacent the leading edge may be disposed to align with at least a portion of the reverse side adjacent the trailing edge to define an overlapping region. A first seam may then be sewn through the overlapping region.

The use of the overlapping region may provide significant embodiments. As described above, the overlapping region is formed by overlapping the obverse side with a portion of the reverse side. When this gas guide with the overlapping region is filled with gas, the pressure of the gas within the gas guide presses outwards against the overlapping portion. The pressure stress resulting from the obverse side attempting to pull away from the reverse side at the first seam due to the pressure exerted by the inflation gas. (This stress is referred to as sheer stress herein). The gas guides utilize a seam that is placed under shear stress, rather than tensile stress, when inflated. This increases the pressure that the inventive textile gas guide can withstand and removes the need for a rigid gas guide. Therefore, airbag modules may be manufactured at a lower cost.

Embodiments of the invention include an airbag module. The airbag module may include an airbag cushion. The airbag cushion may in turn include an inflation throat and a main body. The airbag module may include the textile gas guide. At least a portion of the textile gas guide may be located within the inflation throat. The airbag module may include an inflator nestled within the textile gas guide.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. It should also be understood that the figures are not necessarily to scale. Thus, the following more detailed description of the embodiments of the present invention, as represented in the FIGS. 3A-8, is not intended to limit the scope of the invention, as claimed, but is merely representative of presently preferred embodiments of the invention.

Furthermore, the particular features, structures, or characteristics may be combined in any suitable manner in one or more embodiments. In the following description, numerous specific details are provided to convey a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 1A:
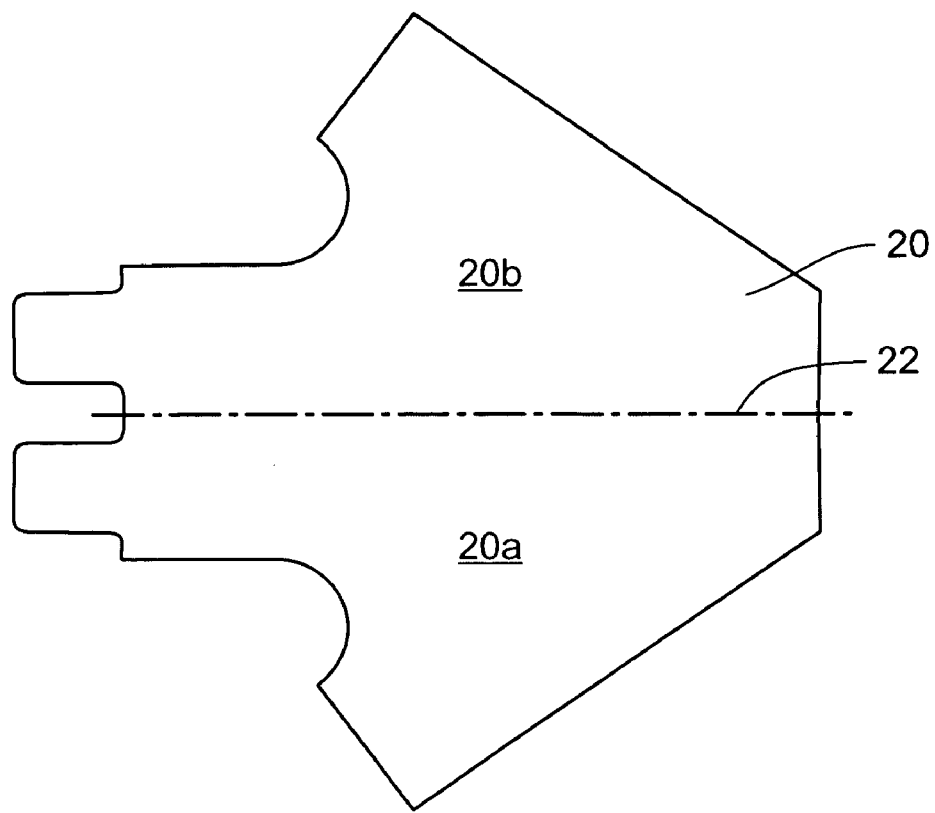
FIG. 1A is a layout view of a prior art midfill textile gas guide for use with a rigid gas guide, the guide being shown in its un-sewn configuration.
Figure 1B:
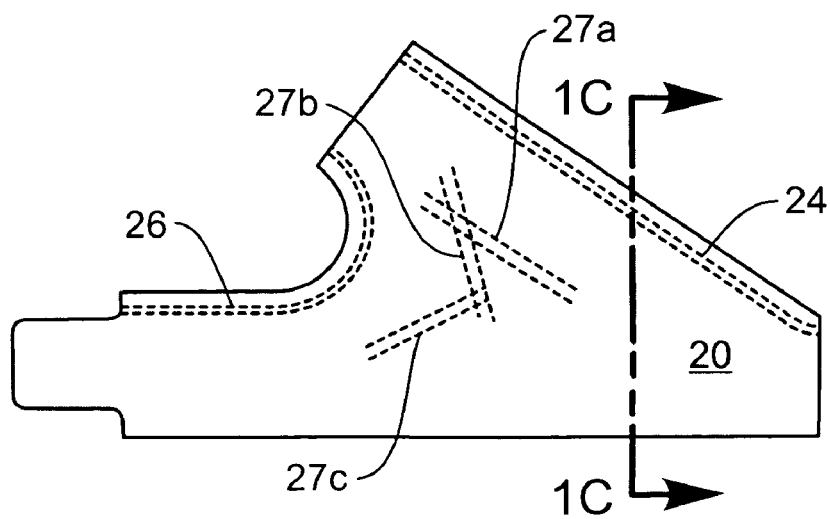
FIG. 1B is a plan view of the midfill textile gas guide of FIG. 1A, the gas guide being shown in its sewn configuration.
Figure 1C:
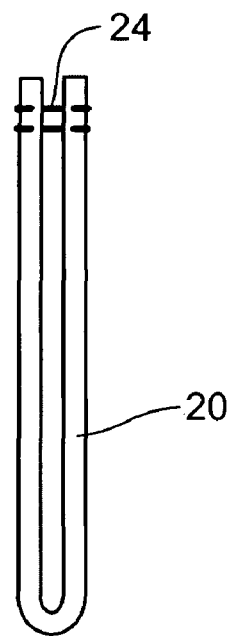
FIG. 1C is a cross-sectional view taken at line 1C-1C of FIG. 1B, the gas guide being shown in its uninflated configuration.
Figure 1D:
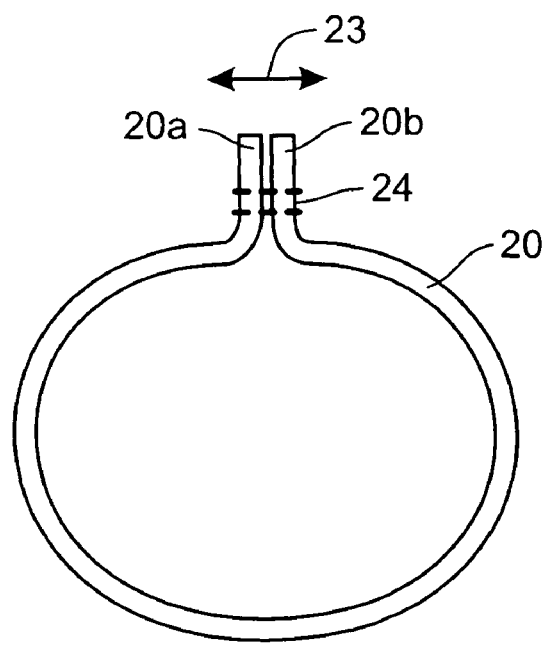
FIG. 1D is a cross-sectional view illustrating inflation of the textile gas guide of FIG. 1C, the gas guide being shown in its inflated configuration.
Figure 2A:
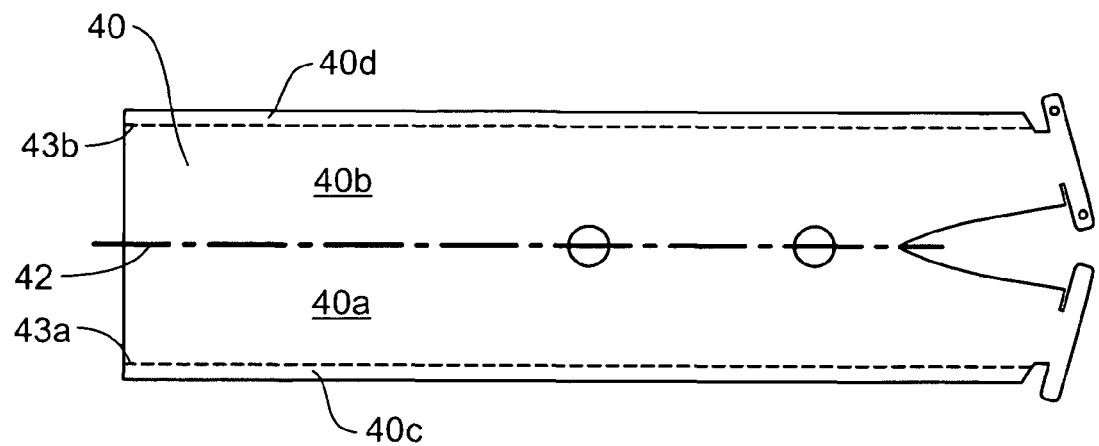
FIG. 2A is a layout view of an unsewn previously known endfill textile gas guide for use with a rigid gas guide.
Figure 2B:
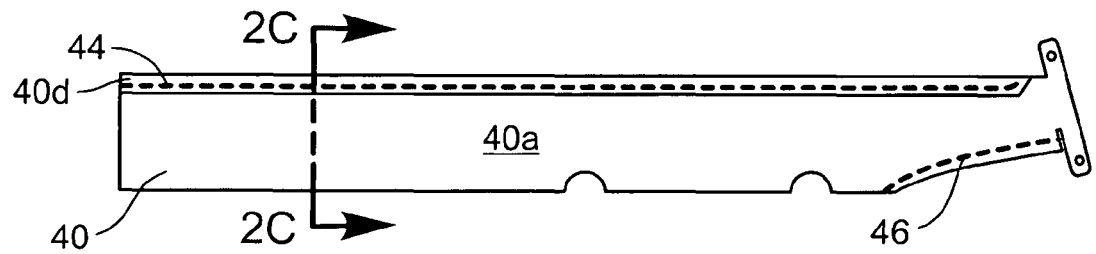
FIG. 2B is a plan view of the sewn endfill textile gas guide of FIG. 2A.
Figure 2C:
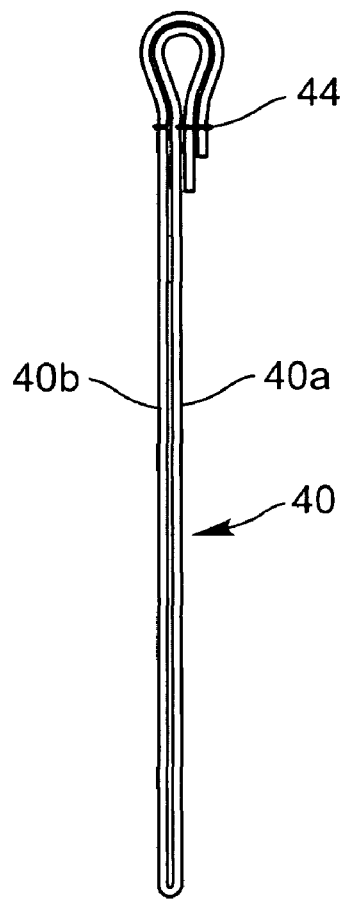
FIG. 2C is a cross-sectional view taken at line 2C-2C of FIG. 2B, the gas guide being shown in its uninflated configuration.
Figure 2D:
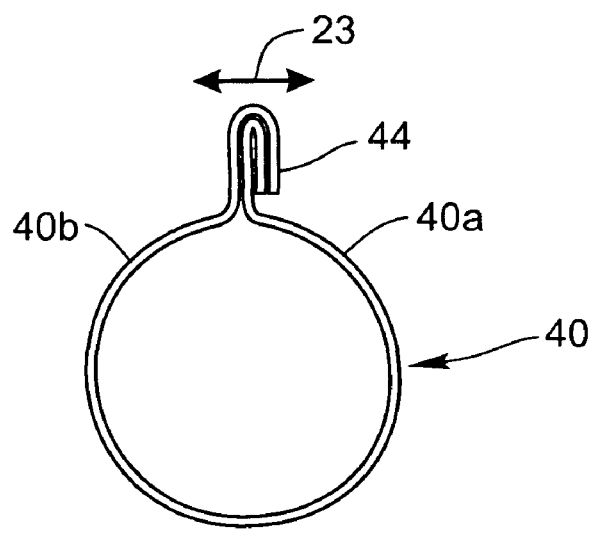
FIG. 2D is a cross-sectional view illustrating the gas guide of FIG. 2B, the gas guide being shown in its inflated configuration.
Figure 3A:
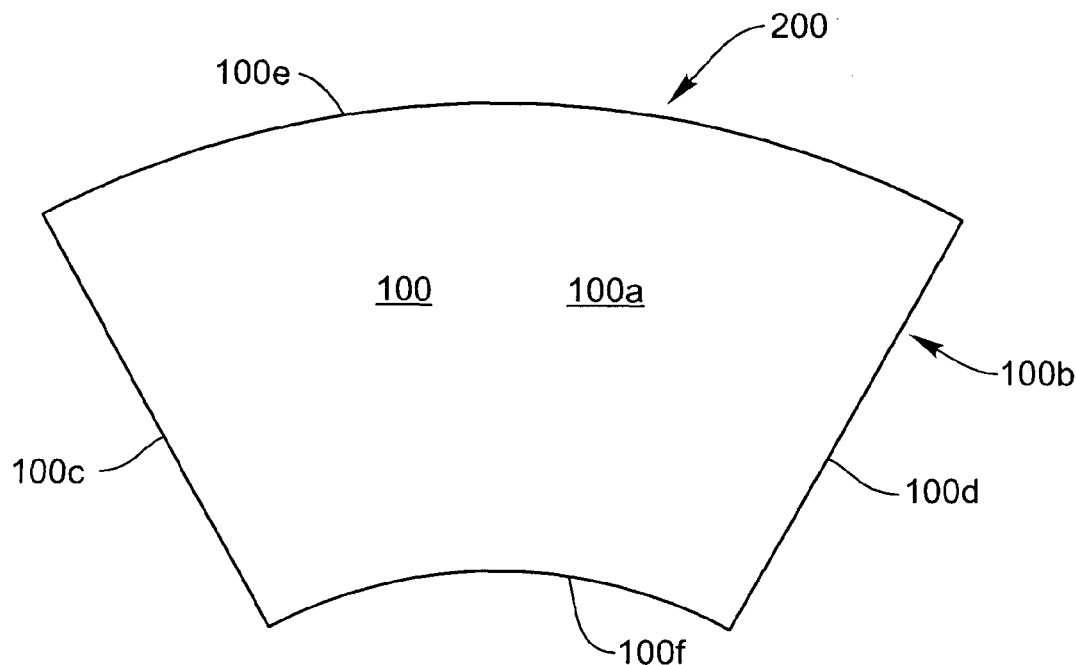
FIG. 3A is a layout view of a textile gas guide according to one embodiment of the invention, the gas guide shown in the unsewn configuration.

FIG. 3A illustrates fabric member 100 of unsewn textile gas guide 200. In one embodiment, textile gas guide 200 may be used as an endfill gas guide. In other embodiments, textile gas guide 200 may be used as a midfill gas guide. In yet other embodiments, textile gas guide 200 may be used as a reverse flow gas guide.

Fabric member 100 may include obverse side 100a, reverse side 100b, leading edge 100c, trailing edge 100d, first edge 100e, and second edge 100f. Fabric member 100 may be coated, uncoated, woven, unwoven, synthetic, or natural fabric, or film.

Figure 3B:
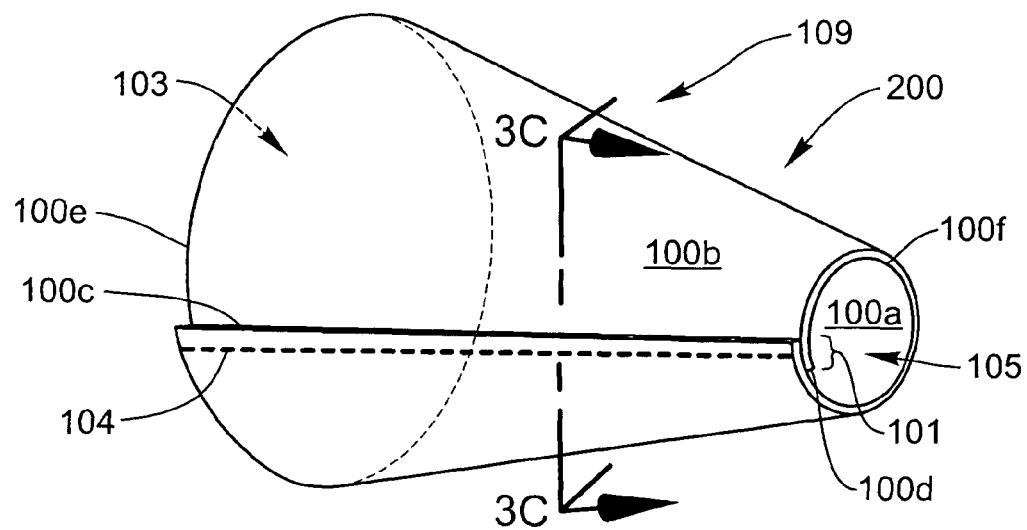
FIG. 3B is a side perspective view of the textile gas guide of FIG. 3A, the gas guide shown in the sewn configuration.

FIG. 3B illustrates that fabric member 100 may be rolled to overlap upon itself at least once such that at least a portion of obverse side 100a adjacent leading edge 100c may be disposed to align with at least a portion of reverse side 100b adjacent trailing edge 100d to define an overlapping region 101. First seam 104 may be sewn through overlapping region 101. First seam 104 may be stitching of different thread weights. First seam 104 may be different stitch types, such as lock, chain, other types known in the art, or a combination thereof. First seam 104 may be a single row of stitching or may be multiple rows of stitching. Of course, other embodiments may be designed which incorporate glue, adhesives, or other attachment mechanisms rather than stitching or sewing.

Figure 3C:
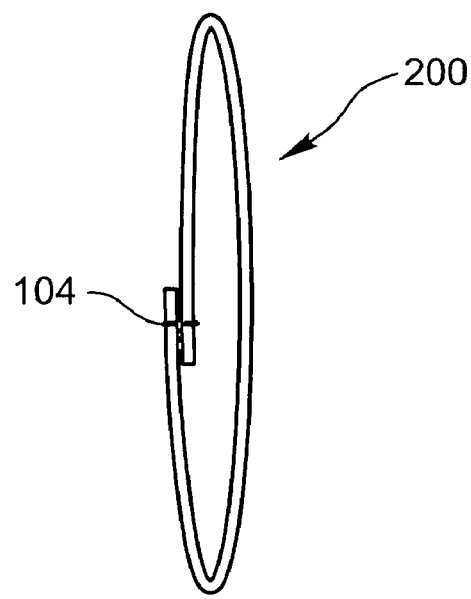
FIG. 3C is a cross-sectional view taken at line 3C-3C of FIG. 3B, the gas guide shown in the uninflated configuration.
Figure 3D:
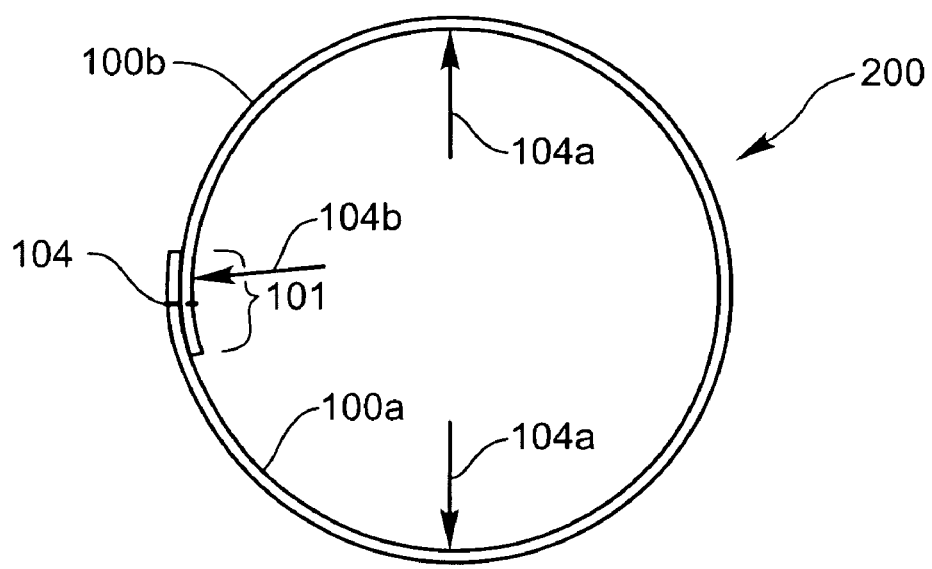
FIG. 3D is a cross-sectional view illustrating of the textile gas guide of FIG. 3B, the gas guide shown in the inflated configuration.

In this embodiment, fabric member 100 when laid flat prior to any sewing may have a generally arcuate shape. Fabric member 100 may conically overlap upon itself to form a sleeve 109 including first opening 103 (illustrated in phantom in FIG. 3B) defined by first edge 100e and second opening 105 defined by second edge 100f. First opening 103 may serve as the outlet and second opening 105 may serve as the inlet. In the depicted embodiment, reverse side 100b is on the outside of sleeve 109. It should be understood that fabric member 100 could be curled such that obverse side 100a is on the outside of sleeve 109. FIGS. 3C and 3D are cross-sectional slices taken along the line 3C-3C of FIG. 3B. FIG. 3C illustrates textile gas guide 200 in an uninflated state. FIG. 3D illustrates textile gas guide 200 in an inflated state. (In practice, an inflator would be present within textile gas guide 200.) As explained herein the first seam 104 is under "shear stress" when the gas guide 200 is inflated. Specifically, when inflated the gas will push outwardly against the fabric. A component of this force, as shown by arrows 104a pushes outwardly and attempts to get the overlapped portion 101 to "un-overlap"—i.e., attempting to have the obverse side 100a attempting to laterally pull away from reverse side 100b at first seam 104. At the same time, a portion of the gas pressing outwardly against the fabric also presses outwardly against the overlapping portion 101, as shown by arrow 104b. Such pressure actually presses the reverse side 100b against the obverse side 100a—i.e., this force actually pushes the two layers forming the overlapping portion together. This component of the force strengthens the seam 104. Accordingly, this shear stress is less likely to cause the seam 104 to fail than is the tensile stress described above with respect to known textile gas guides. In other words, the seam 104 will actually be stronger and less likely to fail. As such, the seam 104 can withstand greater inflation pressures and may even be used without a rigid gas guide.

Figure 3E:
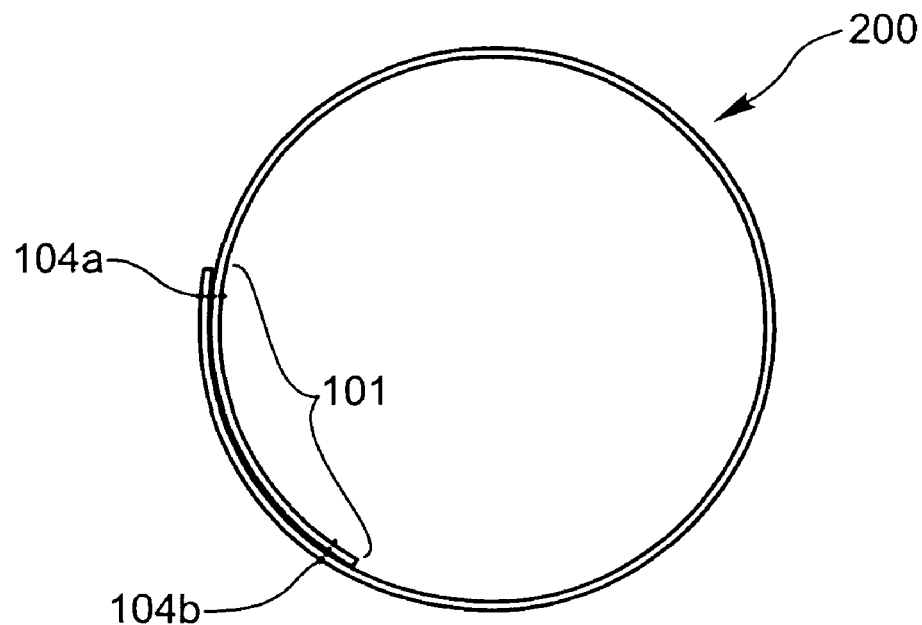
FIGS. 3E & 3F are cross-sectional views that are similar to FIG. 3D that show additional embodiments of a textile gas guide.

Overlapping region 101 may be sufficiently wide to allow for the stitching of first seam 104. Alternatively, overlapping region 101 may be any width desired. For example, overlapping region 101 may be of sufficient width that fabric member 100 overlaps itself at least one time, multiple times, or somewhere in between. FIG. 3E illustrates a cross-sectional slice of an embodiment where overlapping region 101 has sufficient width for stitching first seam 104a as well as additional seam 104b. In the embodiment illustrated in FIG. 3E, additional seam 104b may or may not be present. In that embodiment, fabric member 100 overlaps itself once, but not enough to overlap itself twice.

Figure 3F:
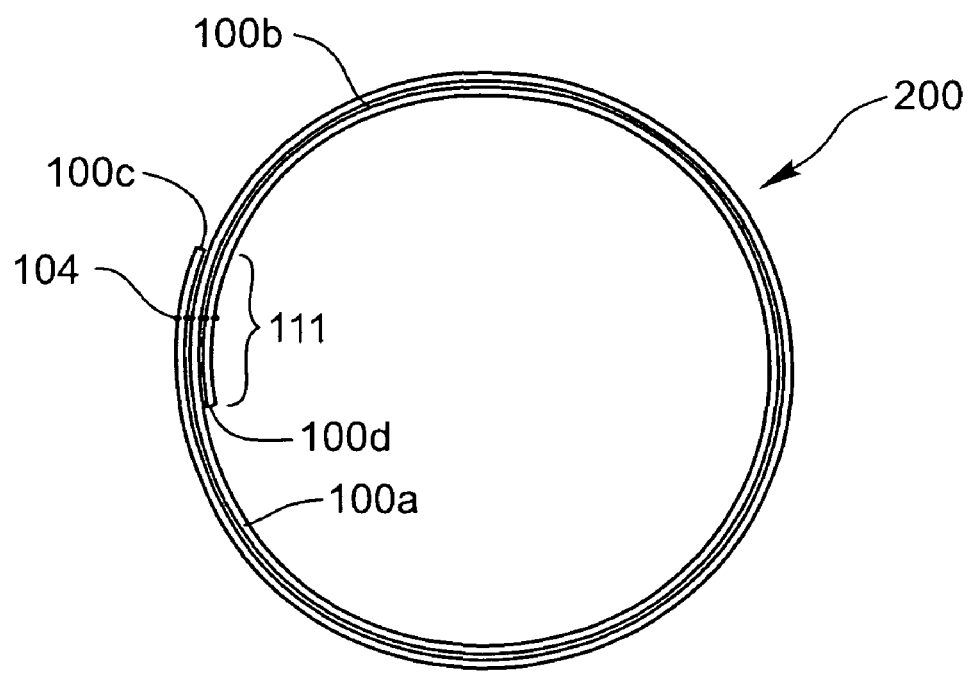

FIG. 3F illustrates a cross-sectional slice of an embodiment where fabric member 100 overlaps upon itself twice such that obverse side 100a adjacent leading edge 100c is disposed to align with reverse side 100b adjacent trailing edge 100d to define twice overlapped region 111. First seam 104 may be sewn through twice overlapped region 111. First seam 104 through twice overlapped region 111 may be placed under shear stress when textile gas guide 200 is inflated.

Figure 4A:
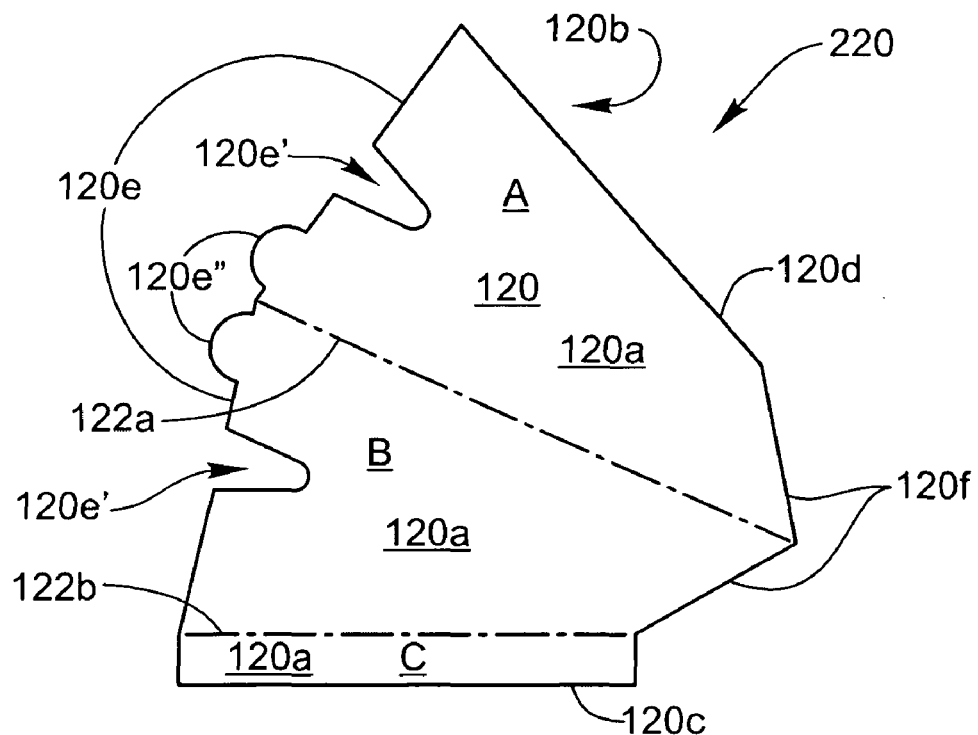
FIG. 4A is a layout view of a textile gas guide according to one embodiment of the invention, the gas guide shown in the unsewn configuration.

FIG. 4A illustrates one embodiment of a midfill textile gas guide 220, a variation of textile gas guide 200. FIG. 4A illustrates fabric member 120 of unsewn textile gas guide 220. Fabric member 120 may include obverse side 120a, reverse side 120b, leading edge 120c, trailing edge 120d, first edge 120e, and second edge 120f. For sake of convenience in describing the folding of textile gas guide 220, fabric member 120 is depicted as having panels A and B divided by fold line 122a and flap C divided from panel B by fold line 122b. However, it should be understood that fabric member 120 may be a continuous piece of fabric. Regarding the folding of textile gas guide 220, obverse side 120a of panel A may be folded towards obverse side 120a of panel B along fold line 122a. The obverse side 120a of flap C may be folded over the reverse side 120b of panel A along fold line 122b.

Figure 4B:
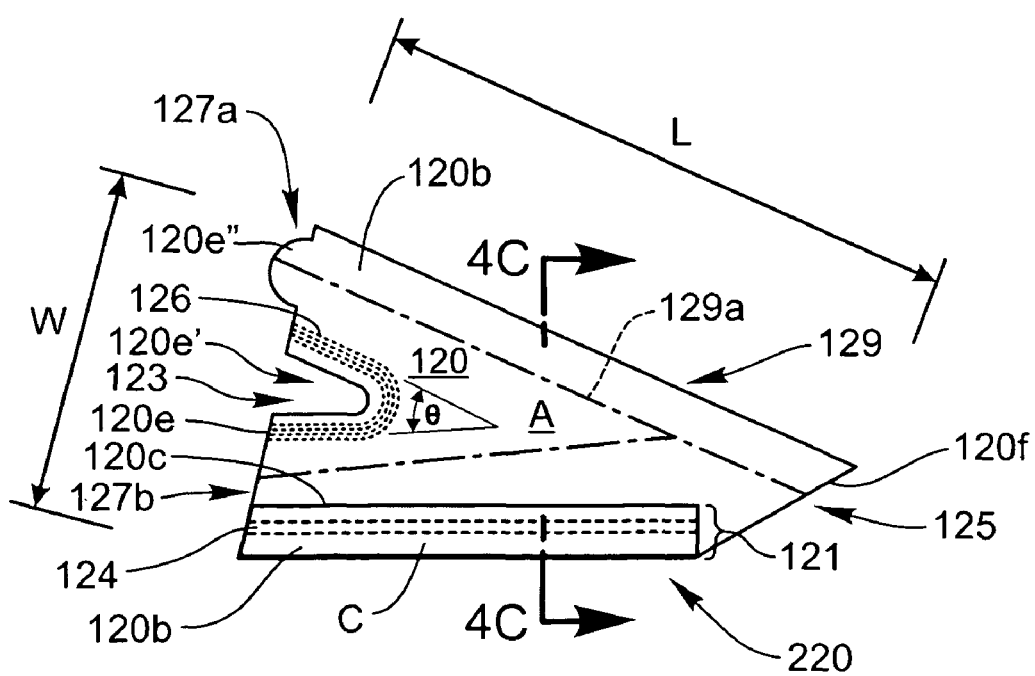
FIG. 4B is a side view of the textile gas guide of FIG. 4A, the gas guide shown in the sewn configuration.

FIG. 4B illustrates that fabric member 120 may overlap upon itself once at fold line 122b such that obverse side 120a of flap C adjacent leading edge 120c may be disposed to align with a portion of reverse side 120b adjacent trailing edge 120d (shown in FIG. 4A) to define an overlapping region 121. In this embodiment, the width of overlapping region 121 is determined by the width of flap C. First seam 124 may be sewn through overlapping region 121. The discussion regarding variation of first seam 104 applies equally to first seam 124.

In this embodiment, fabric member 120 may conically overlap upon itself to form sleeve 129 including first opening 123 defined by first edge 120e and second opening 125 defined by second edge 120f. In this embodiment, first edge 120e may include notches 120e' and tabs 120e". Notches 120e' may align with each other after sleeve 129 is formed. Tabs 120e" may align with each other after sleeve 129 is formed. Tabs 120e" may be used for positioning an inflator within textile gas guide 220. Second seam 126 may be sewn around notches 120e' pinching first opening 123 together to divide first opening 123 into upper opening 127a and lower opening 127b. Second seam 126 may create channel 129a having a "y" shape between upper opening 127a, lower opening 127b, and second opening 125. In this embodiment, upper opening 127a would serve as the inlet and second opening 125 and lower opening 127b would both serve as outlets. Second seam 126 is illustrated as having four rows of stitching. Second seam 126 may include any number of rows of stitching, may utilize any stitching type, and any thread material and weight and any form of adhesive. Of course, other methods of attaching or joining may be used to attach such as glue, sealant, silicone, combination of thread and adhesive, etc. For example, silicon or other adhesive may be used to fasten the inflator to the Y-sock or I-sock or other type of sock (such as a twisable sock). Thus, by using the term "sewing" or "stitching" herein, all types of attachment methods are included.

Textile gas guide 220 may be any length "L" desired. Likewise, textile gas guide 220 may be any width "W" desired. Additionally, the angle "θ" may be any angle desired. Similarly, the widths of upper opening 127a, lower opening 127b, and second opening 125 may be any diameter necessary. It should be understood that first edge 120e and second edge 120f may take any form necessary to achieve a desired shape of textile gas guide 220.

Figure 4C:
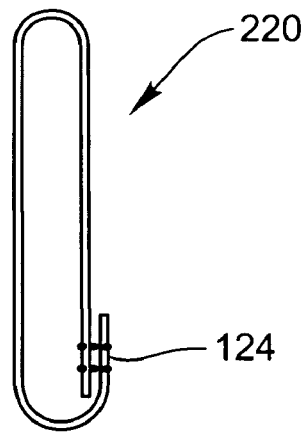
FIG. 4C is a cross-sectional view taken at line 4C-4C of FIG. 4B, the gas guide shown in the uninflated configuration.

FIG. 4C is a cross-sectional slice taken along the line 4C-4C of FIG. 4B. FIG. 4C illustrates textile gas guide 220 in an uninflated state. When inflated, first seam 124 may be placed under shear stress as described above. In other words, a portion of the force of the inflating gas will attempt to cause the overlapping portion to "un-overlap." However, another component of the force actually pushes the layers together, thereby tighting the seal on the overlapping portion. Thus, the overall strength of the seam 134 is strengthened (as compared to the prior art seams of FIGS. 1A-2D).

Figure 4D:
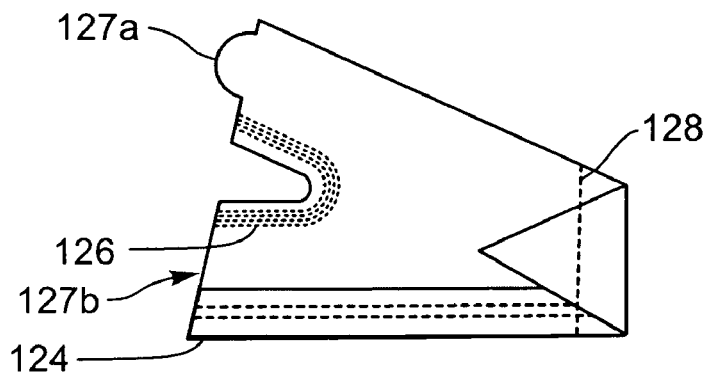
FIG. 4D is a plan view of a variation of textile gas guide of FIG. 4B.
Figure 4E:
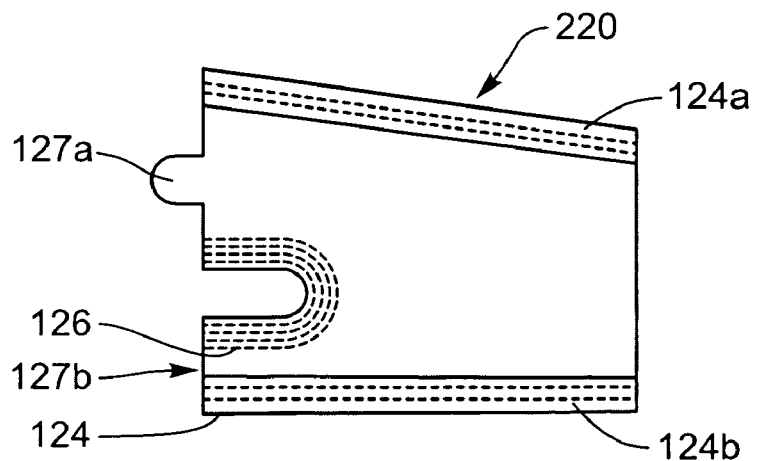
FIG. 4E is a plan view of a variation of textile gas guide of FIG. 4B

FIG. 4D illustrates a variation of midfill textile gas guide 220 where a third seam 128 may be sewn closing off and eliminating the second opening 125. Third seam 128 may include any number of rows of stitching or adhesive (or any other method of fastening). In this embodiment, textile gas guide 220 may be a reverse flow gas guide rather than a midfill. Or, in other words, upper opening 127a may serve as the inlet and lower opening 127b may serve as the only outlet. FIG. 4E illustrates a variation of midfill textile gas guide 220 that is similar to FIG. 4D but may possibly result in a more efficient use of fabric with stitching on both top and bottom 124a and 124b. Of course, this stitching may be other forms of attachment, as known herein.

Figure 5A:
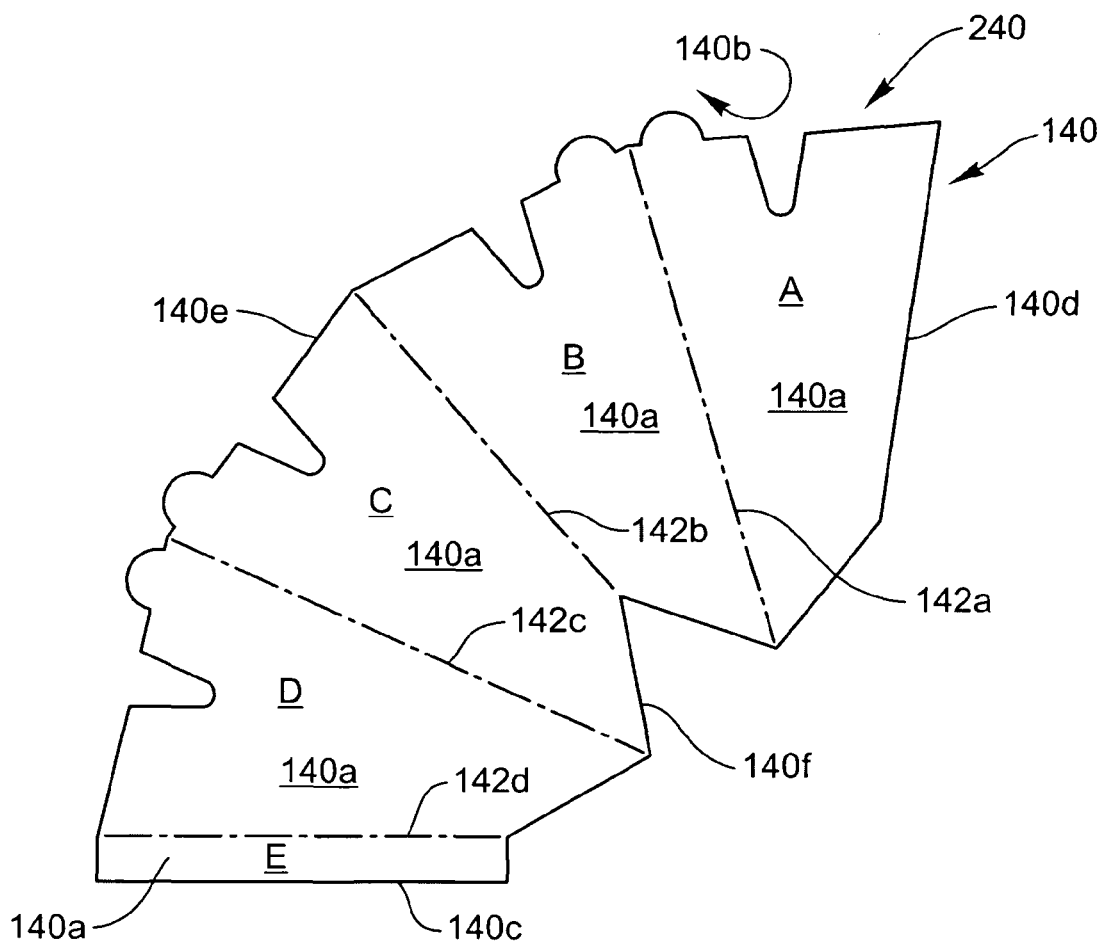
FIG. 5A is a layout view of a textile gas guide according to one embodiment of the invention, the gas guide shown in the unsewn configuration.

FIG. 5A illustrates midfill textile gas guide 240, a double overlapped variation of midfill textile gas guide 220. FIG. 5A illustrates fabric member 140 of unsewn textile gas guide 240. Fabric member 140 may include obverse side 140a, reverse side 140b, leading edge 140c, trailing edge 140d, first edge 140e, and second edge 140f. For sake of convenience in describing the folding of textile gas guide 240, fabric member 140 is depicted as having panels A, B, C, and D and flap E. Panels A and B may be divided by fold line 142a. Panels B and C may be divided by fold line 142b. Panels C and D may be divided by fold line 142c. Panel D and flap E may be divided by fold line 142d. However, it should be understood that fabric member 140 may be a continuous piece of any type of suitable fabric.

Regarding the folding of textile gas guide 240, the obverse side 140a of panel A may be folded towards obverse side 140a of panel B along fold line 142a. The reverse side 140b of panel A may be folded towards the obverse side 140a of panel C along fold line 142b. The obverse side 140a of panel D may be folded towards the reverse side 140b of panel B along fold line 142c. The obverse side 140a of flap E may be folded over the reverse side 140b of panel C along fold line 142d. In the depicted embodiment, panels A, B, C, and D are all the same dimensions. It should be readily understood that it may be necessary to increase the width of panels C and D relative to panels A and B in order to completely wrap around panels A and B.

Figure 5B:
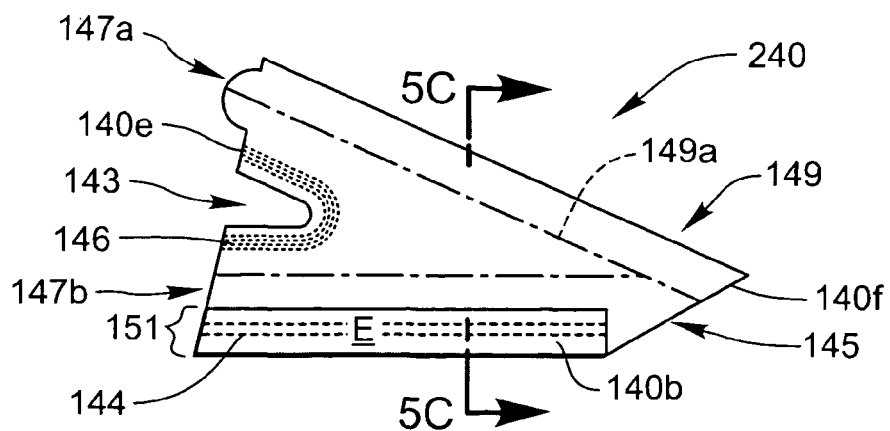
FIG. 5B is a side view of the textile gas guide of FIG. 5A, the gas guide shown in the sewn configuration.

FIG. 5B illustrates a folded textile gas guide 240. It should be understood based on the folding description that fabric member 140 may overlap upon itself twice. FIG. 5B illustrates flap E overlapping panel C. Not depicted is that obverse side 140a of flap E adjacent leading edge 140c may be disposed to align with a portion of reverse side 140b of panel A adjacent trailing edge 140d to define a twice overlapped region 151 (best shown hereinafter in FIG. 5C). In this embodiment, the width of twice overlapped region 151 may be determined by the width of flap E. First seam 144 may be sewn through twice overlapped region 151. First seam 144 is illustrated as having two rows of stitching. The discussion regarding variability of first seam 104 applies equally to first seam 144. Adhesive may also be used in place of stitching.

In this embodiment, fabric member 140 may conically overlap upon itself twice to form sleeve 149 including first opening 143 defined by first edge 140e and second opening 145 defined by second edge 140f. First edge 140e and second edge 140f may be shaped so that first opening 143 is similar to first opening 123 and second opening 145 is similar to first opening 125. Second seam 146 may be sewn to pinch first opening 143 together to divide first opening 143 into upper opening 147a and lower opening 147b. Second seam 146 may create a channel 149a having a "y" shape between upper opening 147a, lower opening 147b, and second opening 145. In this embodiment, upper opening 147a may serve as the inlet and second opening 145 and lower opening 147b may both serve as outlets. Second seam 146 is illustrated as having four rows of stitching. Second seam 146 may include any number of rows of stitching or any other method of fastening/attaching.

The discussion regarding the variability of shape and dimension of textile gas guide 220 applies also to textile gas guide 240. Additionally, second opening 145 of textile gas guide 240 may be eliminated by being sewn closed to form a reverse flow gas guide.

Figure 5C:
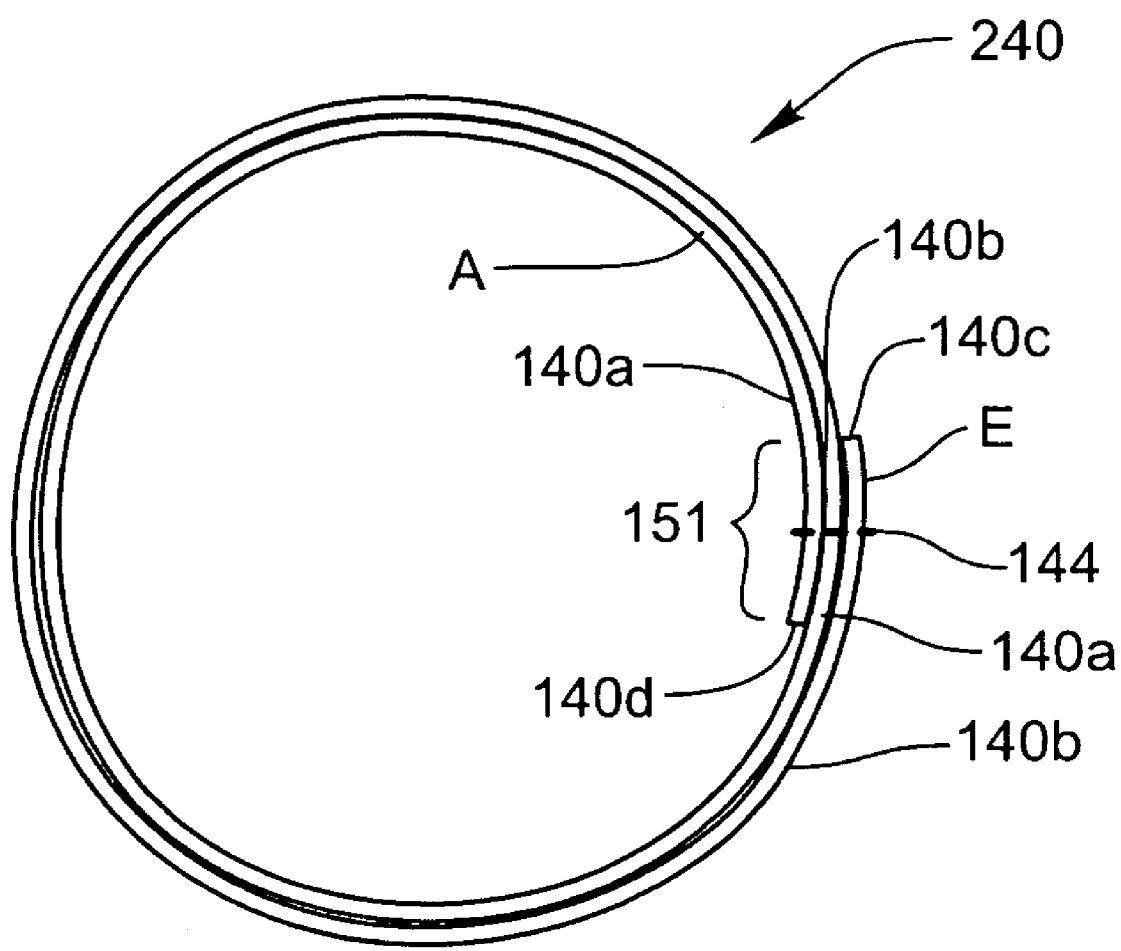
FIG. 5C is a cross-sectional view taken at line 5C-5C of FIG. 5B illustrating inflation of the textile gas guide, the gas guide shown in the uninflated configuration.

FIG. 5C is a cross-sectional slice taken along the line 5C-5C of FIG. 5B. FIG. 5C illustrates textile gas guide 240 in an inflated state. When inflated, first seam 144 may be placed under shear stress. FIG. 5C illustrates that fabric member 140 may overlap upon itself twice, such that obverse side 140a of flap E adjacent leading edge 140c may be disposed to align with a portion of reverse side 140b of panel A adjacent trailing edge 140d to define a twice overlapped region 151. In this embodiment, the width of twice overlapped region 151 may be determined by the width of flap E. First seam 144 may be sewn through twice overlapped region 151. First seam 144 is illustrated as having a single row of stitching; however, any number of rows may be present.

Again, the presence of the overlapped region 151 means that the seam 144 will be stronger than the prior art, as has been discussed above.

Figure 6A:
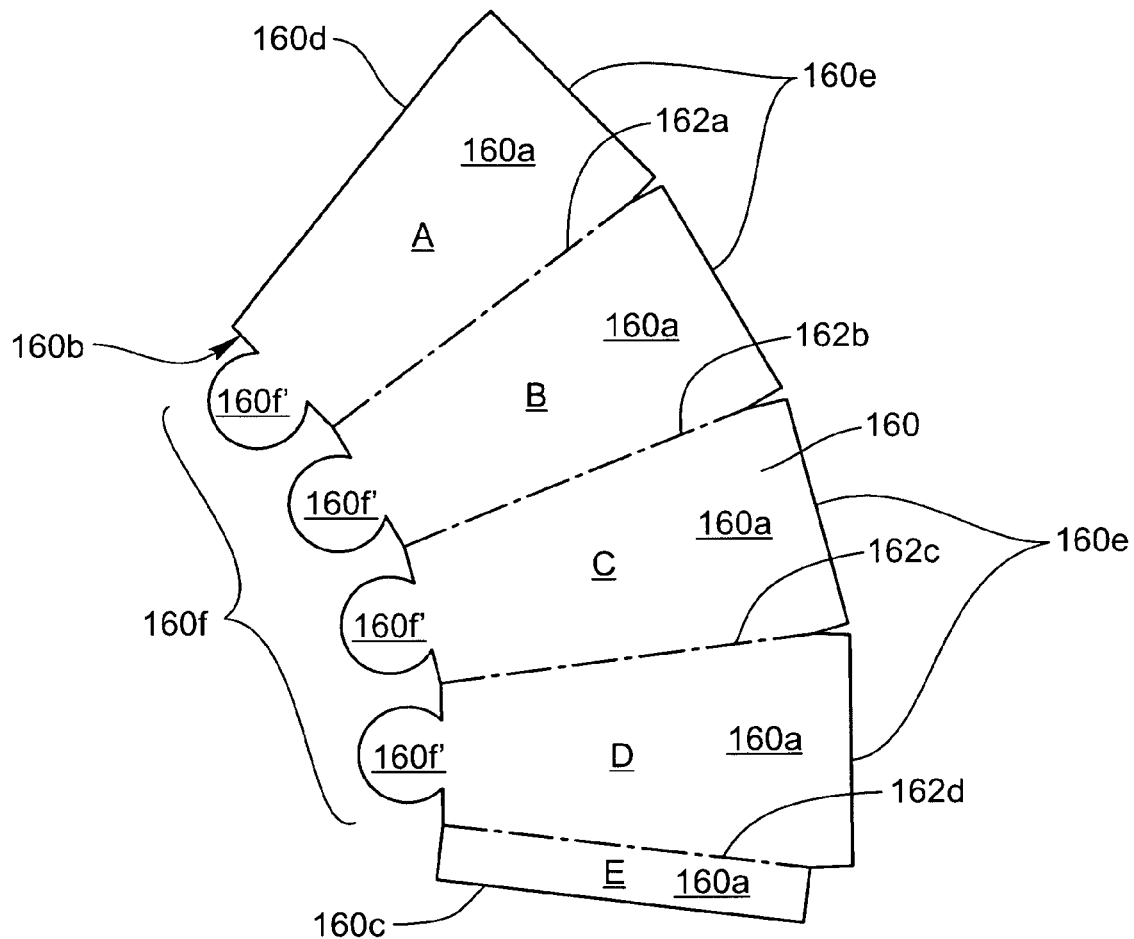
FIG. 6A is a layout view of a textile gas guide according to one embodiment of the invention, the gas guide shown in the unsewn configuration.

FIG. 6A illustrates an endfill gas guide 260, a variation of textile gas guide 200. FIG. 6A illustrates fabric member 160 of unsewn textile gas guide 260. Fabric member 160 may include obverse side 160a, reverse side 160b, leading edge 160c, trailing edge 160d, first edge 160e, and second edge 160f. For sake of convenience in describing the folding of textile gas guide 260, fabric member 160 is depicted as having panels A, B, C, and D and flap E. Panels A and B may be divided by fold line 162a. Panels B and C may be divided by fold line 162b. Panels C and D may be divided by fold line 162c. Panel D and flap E may be divided by fold line 162d. However, it should be understood that fabric member 160 may be a continuous piece of any type of fabric suitable.

Regarding the folding of textile gas guide 260, the obverse side 160a of panel A may be folded towards obverse side 160a of panel B along fold line 162a. The reverse side 160b of panel A may be folded towards the obverse side 160a of panel C along fold line 162b. The obverse side 160a of panel D may be folded towards the reverse side 160b of panel B along fold line 162c. Flap E may be folded towards obverse side 160b of panel C along fold line 162d. In the depicted embodiment, panels A, B, C, and D are all the same dimensions. It should be readily understood that it may be necessary to increase the width of panels C and D relative to panels A and B in order to completely wrap around panels A and B.

Figure 6B:
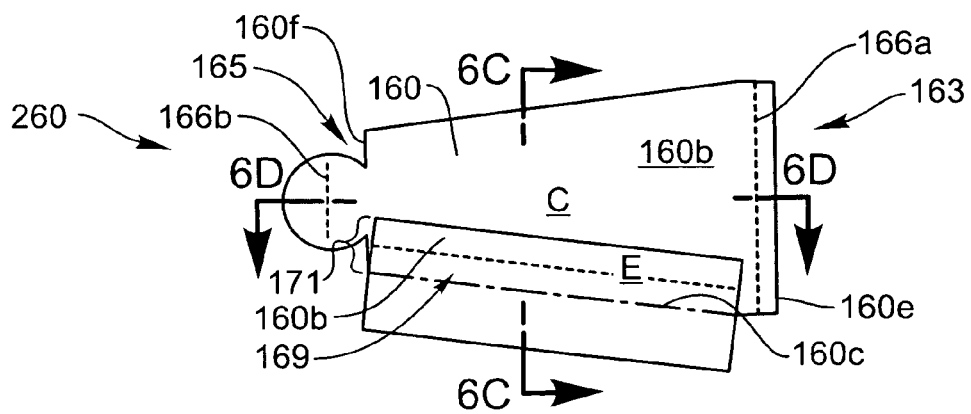
FIG. 6B is a side view of the textile gas guide of FIG. 6A, the gas guide shown in the sewn configuration.

FIG. 6B illustrates a folded textile gas guide 260. It should be understood based on the folding description that fabric member 160 may overlap upon itself twice in this embodiment. FIG. 6B illustrates flap E overlapping panel C. Not depicted is that obverse side 160a of flap E adjacent leading edge 160c may be disposed to align with a portion of reverse side 160b of panel A adjacent trailing edge 160d (not shown) to define a twice overlapped region 171 (best shown hereinafter in FIG. 6C). In this embodiment, the width of twice overlapped region 171 may be determined by the width of flap E. First seam 164 may be sewn through twice overlapped region 171.

In this embodiment, fabric member 160 may conically overlap upon itself twice to form sleeve 169 including first opening 163 defined by first edge 160e and second opening 165 defined by second edge 160f. First opening 163 may serve as the inlet and second opening 165 may serve as the outlet. Additional seam 166a and 166b may be used to add additional shear seams to the gas guide. Also, seam 166a may be used to attach the textile gas guide 260 to an airbag cushion (not shown). Additional seam 166a and 166b may utilize tack stitching, or in other words, temporary stitching. Alternatively, additional seam 166a and 166b may be permanent stitching or adhesive.

Figure 6C:
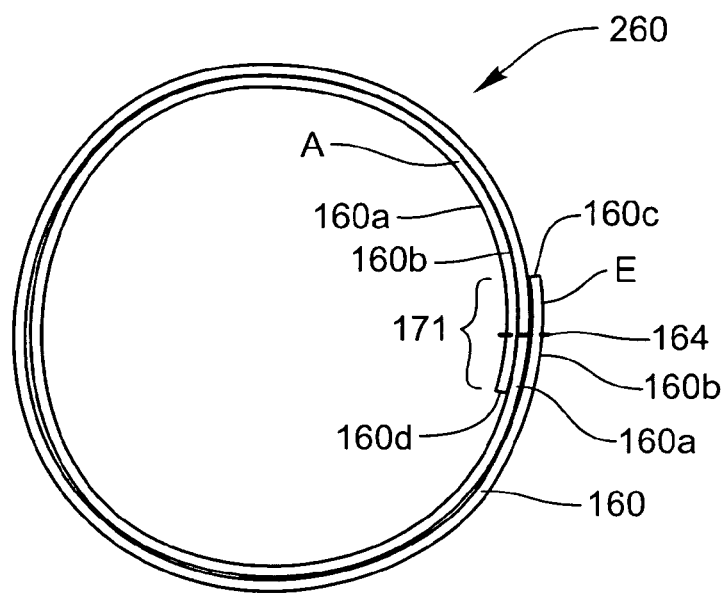
FIG. 6C is a cross-sectional view taken at line 6C-6C of FIG. 6B illustrating the textile gas guide in the inflated configuration.

FIG. 6C is a cross-sectional slice taken along the line 6C-6C of FIG. 6B. FIG. 6C illustrates textile gas guide 260 in an inflated state. When inflated, first seam 164 may be placed under shear stress. FIG. 6C illustrates that fabric member 160 overlaps upon itself twice, such that obverse side 160a of flap E adjacent leading edge 160c may be disposed to align with a portion of reverse side 160b of panel A adjacent trailing edge 160d to define a twice overlapped region 171. In this embodiment, the width of twice overlapped region 171 may be determined by the width of flap E. First seam 164 may be sewn through twice overlapped region 171. First seam 164 is illustrated as having a single row of stitching. The same discussion regarding variability of first seam 104 applies equally to first seam 164.

Again, the presence of the overlapped region 171 means that the seam 164 will be stronger than the prior art, as has been discussed above.

Figure 6D:
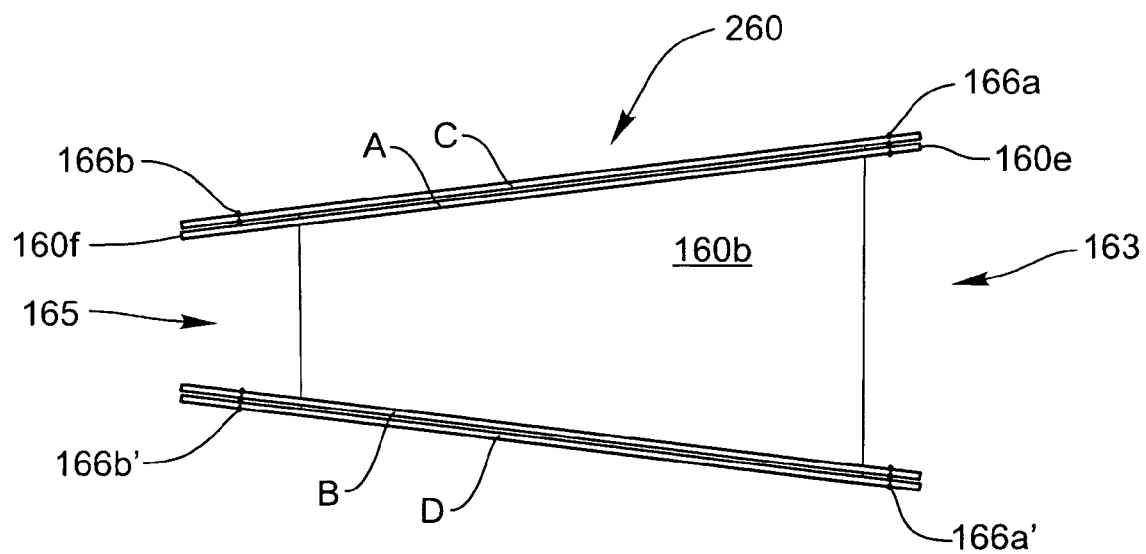
FIG. 6D is a cross-sectional view taken at line 6D-6D of FIG. 6B illustrating additional sewing of the textile gas guide.

FIG. 6D is a cross-sectional slice taken along the line 6D-6D of FIG. 6B. Additional seam 166a and 166b may not close off first opening 163 and second opening 165. Additional seam 166a and 166b may be sewn through panels A and C. Additional seam 166a' and 166b' may mirror additional seam 166a and 166b. Additional seam 166a' and 166b' may be sewn through panels B and D. Additional seam 166a' and 166b' may also be used to attach textile gas guide 260 to an airbag cushion (not shown). Again, instead of sewing or stitching, adhesives may be used, as desired. The b and b' seams could be sewn in one continuous loop. Additional continuous loop seams could also be added.

It should be understood that textile gas guide 260 may be varied in a number of ways. For example, the diameter of first opening 163 relative to second opening 165 may be varied. Likewise, the length of leading edge 160c and trailing edge 160d relative to first edge 160e may be varied. Additionally, the course or path of first edge 160e and second edge 160f may be modified. Textile gas guide 260 may also be modified such that fabric member 160 only overlaps itself once. For example, panels A and B could be removed from fabric member 160.

Figure 7A:
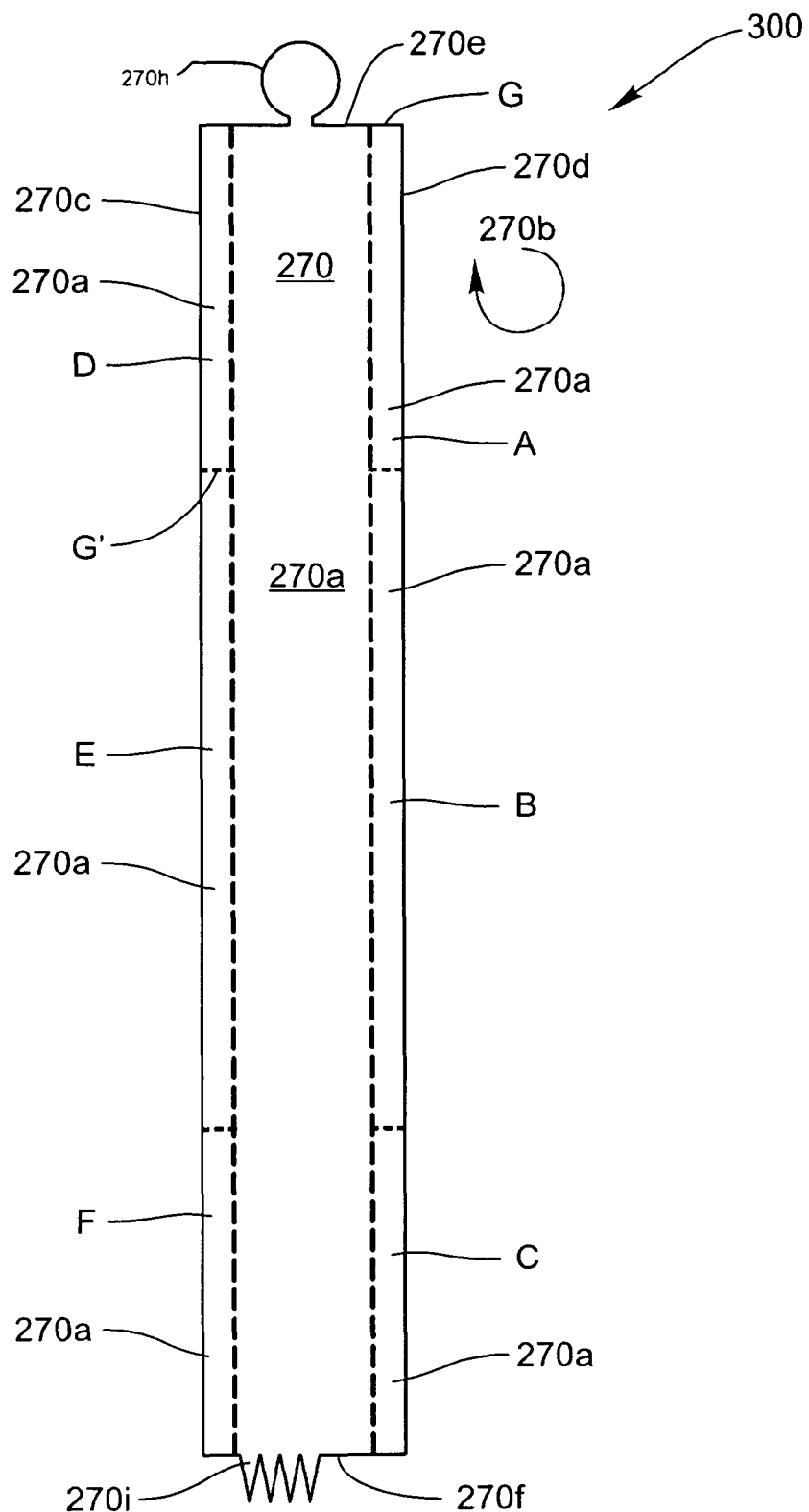
FIG. 7A is a layout view of an textile gas guide according to one embodiment of the invention, the guide being shown in the unsewn configuration.

FIG. 7A illustrates fabric member 270 of unsewn textile gas guide 300. In one embodiment, textile gas guide 300 may be used as an endfill gas guide. Fabric member 270 may have a generally rectangular shape. Other shapes such as triangular, pyramidal, trapezoidal, trapezoidal with curved edges, trapezoidal with a fluted, tapered, profile, etc. may also be used. Further embodiments, may be designed in which the fabric member 270 has the shape of a parallelogram or any other desired shape. The edges of sides, of course, do not necessarily have to be straight, but can be curved, uneven, etc. as desired. Fabric member 270 may include obverse side 270a, reverse side 270b, leading edge 270c, trailing edge 270d, first edge 270e, and second edge 270f. Fabric member 270 may have an upper portion A, intermediate portion B, and lower portion C adjacent trailing edge 270d. Fabric member 270 may have an upper portion D, intermediate portion E, and lower portion F adjacent leading edge 270c. However, it should be understood that fabric member 270 may be a continuous piece of any type of suitable fabric. For the sake of convenience, FIG. 7A also illustrates alignment edge G and corresponding alignment marker G'. Alignment edge G may be the portion of first edge 270e bounding upper portion A. Alignment marker G' may be the boundary between upper portion D and intermediate portion E. Further, it should be noted that the member 270 may optionally include teeth 270i or an extension 270h. These features are added along the perimeter of the member 270. These features may be added anywhere along the perimeter, as desired, including through edges A through G or edges 270c, edge 270d, edge 270e, 270f, or any other edge or side of the material.

Figure 7B:
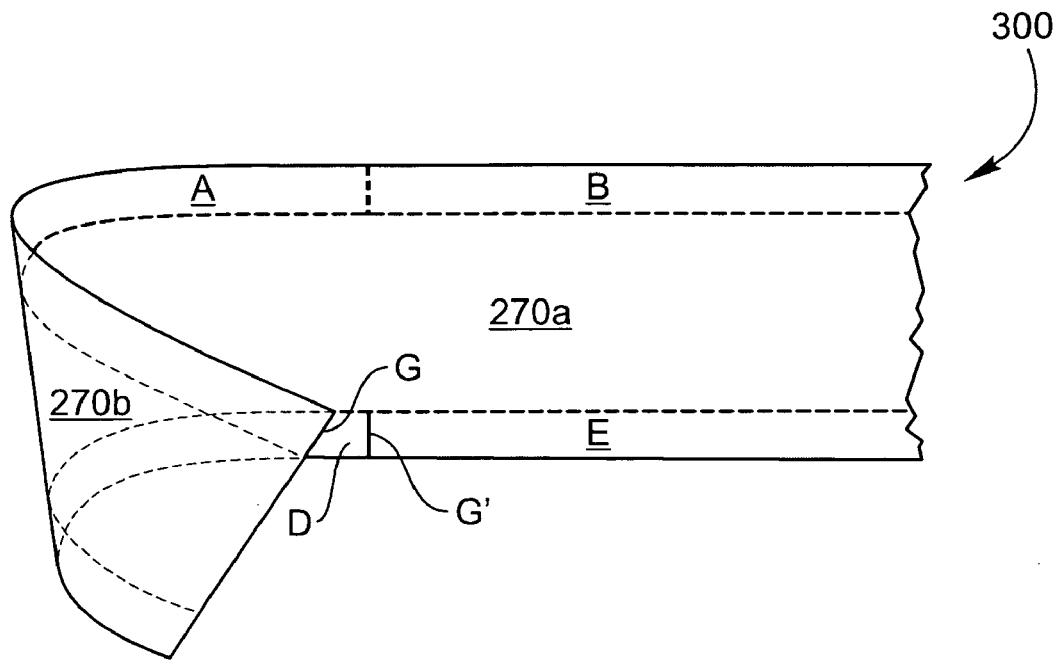
FIG. 7B is a perspective view of the textile gas guide of FIG. 7A being rolled prior to sewing.
Figure 7C:
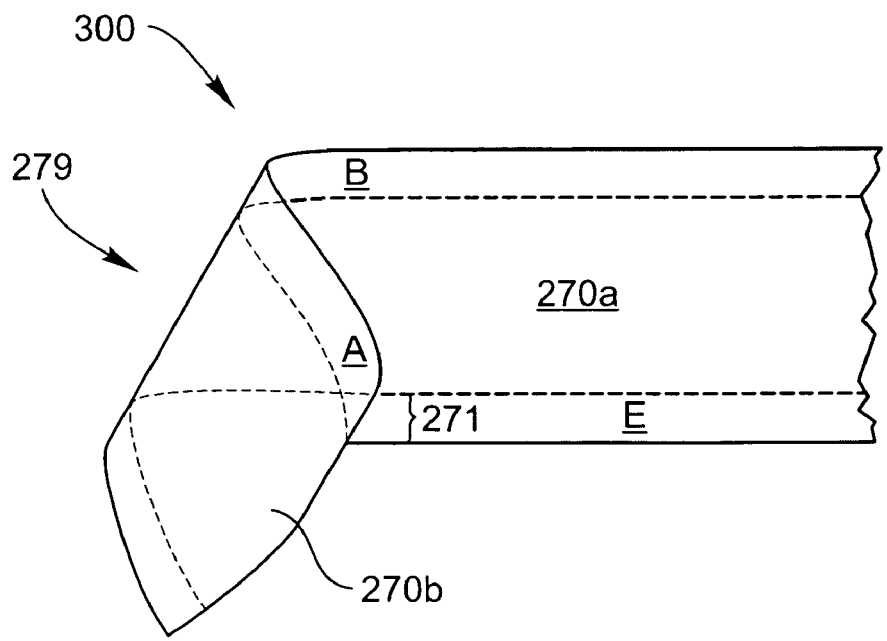
FIG. 7C is a perspective view of the textile gas guide of FIG. 7A showing the initial roll of the material prior to sewing.

FIG. 7B illustrates that alignment edge G may be curled or rolled towards alignment marker G'. FIG. 7C illustrates that fabric member 270 may spirally overlap upon itself at least once to form sleeve 279, such that reverse side 270b of upper portion A and intermediate portion B may be disposed to align with obverse side 270a of intermediate portion E and lower portion F to define an overlapping region 271. In the depicted embodiment, reverse side 270b is on the outside of sleeve 279. It should be understood that fabric member 270 could be curled such that obverse side 270a is on the outside of sleeve 279.

Figure 7D:
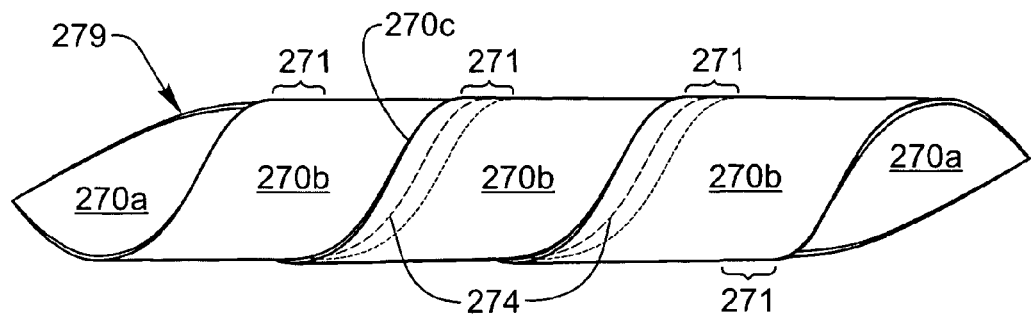
FIG. 7D is a side perspective view of the fully rolled textile gas guide of FIG. 7A, the guide being shown in the sewn configuration.

FIG. 7D illustrates one embodiment of a sleeve 279. First seam 274 may be sewn through overlapping region 271. FIG. 7D illustrates gas guide 300 in an inflated state. When inflated, first seam 274 may be placed in shear stress. The shear stress may result from obverse side 270a attempting to pull away from reverse side 270b at first seam 274 due to the pressure exerted by the inflation gas.

In one embodiment, leading edge 270c may have a length 6.5 times the length of first edge 270e. The width of overlapping region 271 may be about 18.75% of the length of first edge 270e (i.e., the length is greater than the width). In another embodiment, first edge 270e and second edge 270f may each be 80 mm (3.1 inch) in length. Alignment edge G and alignment marker G' may each be 15 mm (0.6 inch) in length (i.e., overlapping region 271 may be 15 mm in width). Leading edge 270c along upper portion D and trailing edge 270d along upper portion A may each be 130 mm (5.1 inch) in length. The resulting sleeve 279 may have a length of about 150 mm (5.9 inch), a diameter of about 42 mm (1.7 inch), and a perimeter of about 130 mm (5.1 inch). Of course, these dimensions are given as examples only. Other sizes and/or configurations are possible.

Sleeve 279 may be any length and diameter. For example, the length of leading edge 270c may any length necessary to achieve a desired sleeve length. Additionally, the length of first edge 270e may chosen so as to achieve a desired diameter and length.

Overlapping region 271 may be sufficiently wide to allow for the attaching, fastening, or stitching of first seam 274. In the illustrated embodiment, the width of overlapping region 271 is such that fabric member 270 only overlaps itself once as overlapping region 271 spirals around sleeve 279. The width of overlapping region 271 may be increased to increase the overlap of fabric member 270 upon itself.

For example, in other embodiments, the width of overlapping region 271 may be equal to more than half the length of first edge 270e. In such embodiments, as overlapping region 271 spirals around sleeve 279 a region would be created where fabric member 270 overlaps itself twice. This twice overlapped region (not shown) would spiral around sleeve 279 similar to the depicted overlapping region 271. First seam 274 may be sewn through this twice overlapped region.

In another example, in other embodiments, the width of overlapping region 271 may be equal to ¾ or more the length of first edge 270e. In such embodiments, as overlapping region 271 spirals around sleeve 279, a region would be created where fabric member 270 overlaps itself three times. This three times overlapped region (not shown) would spiral around sleeve 279 similar to the depicted overlapping region 271. First seam 274 may be sewn through this three times overlapped region.

Again, the presence of the overlapped region 271 means that the seam 274 will be stronger than the prior art, as has been discussed above. Again, it should be noted that the embodiments of FIGS. 7A-7D (and the other embodiments disclosed herein) could be fabricated using methods other than stitching.

Figure 8:
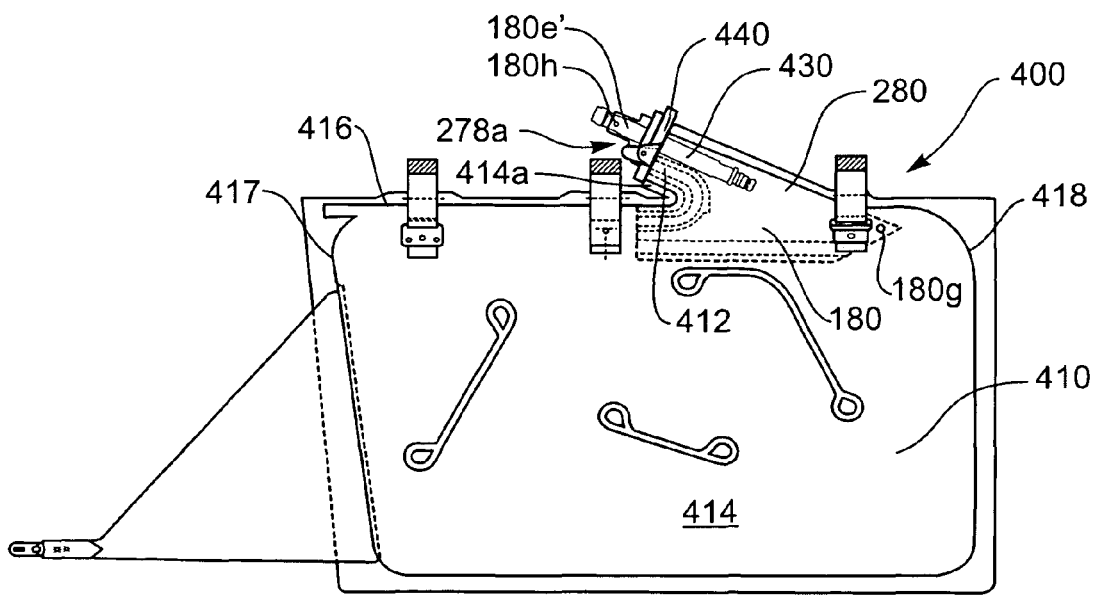
FIG. 8 is a plan view of an airbag module according to one embodiment of the invention, the airbag module including a textile gas guide.

FIG. 8 illustrates airbag module 400. Airbag module 400 may include airbag cushion 410. Airbag cushion 410 may in turn include an inflation throat 412 and a main body 414. Airbag module 400 may include textile gas guide 280 (shown mostly in phantom). Textile gas guide 280 may be a variation of textile gas guides 220 or 240. Airbag module 400 may include inflator 430 (not shown in phantom for clarity) inserted into textile gas guide 280.

At least a portion of a textile gas guide 280 may be located within inflation throat 412. The inflation throat 412 is the portion of the airbag cushion 410 that receives the gas produced by the inflator. The throat 412 then directs the gas into the inflatable areas of the airbag 410.

In one embodiment, upper opening 287a of textile gas guide 280 may extend beyond inflation throat 412 while the remainder of textile gas guide 280 may be located within inflation throat 412 and main body 414. Inflator 430 may be inserted within upper opening 287a of textile gas guide 270. Inflator 430 may be axially in line with upper opening 287a and inflation throat 412. Inflator 430 may also be parallel with top edge 416 of airbag cushion 410.

In one embodiment, inflation throat 412 may be located along any outer edge of airbag cushion 410. For example, inflation throat 412 may be generally (i.e., substantially all or a portion) in the recess 414a. Recess 414a may be centrally located along top edge 416 of airbag cushion 410, relative to when airbag cushion 410 is in an unfolded state. Inflation throat 412 may be orientated generally (i.e., substantially) parallel to top edge 416 of airbag cushion 410. Inflation throat 412 may extend along or beneath top edge 416 of airbag cushion 410. In another example, inflation throat 412 may be located at either corner 417 or corner 418 of airbag cushion 410.

Generally speaking, when inflation throat 412 is centrally located along an outer edge, such as in recess 414a, then a midfill gas guide may be used, such as textile gas guides 220, 240, or 280. When inflation throat 412 is located at a corner, such as corner 417 or 418, then an endfill gas guide may be used, such as textile gas guide 260 or 300. However, it should be understood that the embodiments of the invention are not limited to that general rule. Other embodiments may be designed in which the throat 412 is an extension that is positioned above the airbag 410 and directs the gas downwards (or substantially downward) into the airbag 410.

Airbag cushion 410 is depicted as having a generally rectangular shape and a single compartment. Airbag cushion 410 may have a variety of shapes, multiple compartments, and multiple inflators utilizing variations of textile gas guides 200 (e.g., textile gas guides 220, 240, 260, and 280 and other variations) and textile gas guides 300. Airbag cushion 410 may be made using one-piece weaving, by having 2 fabric layers cut and sewn, or by having 2 fabric layers cut, sealed and then sewn.

Textile gas guide 280 may be sewn to airbag cushion 410. Tack stitches (not shown) may be used in sewing textile gas guide 280 to airbag cushion 410. Textile gas guide 280 may include positioning hole 180g in fabric member 180. Positioning hole 180g may be designed to mate with a protrusion or other securing device (not shown) within main body 414. Positioning hole 180g may be for positioning textile gas guide 280 within inflation throat 412 and main body 414 prior to sewing textile gas guide 280 to airbag cushion 410. Textile gas guide 280 may also include a positioning hole 180h in tab 180e". Positioning hole 180h may be designed to mate with a protrusion or other securing device (not shown) on inflator 430. Positioning hole 180h may be for positioning inflator 430 within textile gas guide 280.

Airbag module 400 may also include clamping means 440 for securing together inflator 430, textile gas guide 280, and inflation throat 412. In one embodiment, clamping means 440 may be a ring clamp. Airbag module 400 may be an inflatable curtain, also known as a side-impact airbag. Airbag module 400 may include multiple airbag cushions 410. Airbag module 400 may utilize multiple textile gas guides 200 and 300 and variations thereof.

To summarize, this invention presents a significant advancement in the art in that it provides textile gas guides 200, 220, 240, 260, 280, and 300 that do not require the use of a rigid gas guide. Textile gas guides 200, 220, 240, 260, 280, and 300 utilize a seam that is placed under shear stress, rather than tensile stress, when inflated. This increases the pressure that textile gas guide 200, 220, 240, 260, 280, and 300 can withstand and removes the need for a rigid gas guide. Therefore, airbag modules 400 may be manufactured at a lower cost than conventional airbag modules.

Additionally, the invention provides for an airbag module 400 including airbag cushion 410 with inflation throat 412 that may be parallel to top edge 416 of airbag cushion 410. Therefore, inflator 430 may be mounted parallel to top edge 416 of airbag cushion 410. That allows airbag module 400 to be linearly mounted to a vehicle. In some situations, this may reduce the cost and difficulty of mounting an inflator at an angle.

Furthermore, the invention provides for airbag module 400 including airbag cushion 410 with inflation throat 412 that may extend along or beneath top edge 416 of airbag cushion 410. That reduces the amount of fabric necessary to sew airbag cushion 410. Conventional midfill inflation throats extend from the top of the airbag cushion. That necessitates using a large piece of fabric when utilizing weaving (including but not limited to, for example, one-piece weaving) and then cutting away the extra material around the inflation throat. That results in a waste of fabric. The invention reduces expense and waste because inflation throat 412 in certain embodiments does not extend beyond the perimeter of main body 414 of airbag cushion 410. Therefore, a smaller piece of fabric may be utilized and less material is discarded. In some situations, the smaller fabric size means that more airbag cushions 410 may be woven on the beam of a weaving machine compared to conventional airbag cushions. Alternatively, a smaller beam may be used to weave a conventional number of airbag cushions 410.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A textile gas guide for an airbag module, said textile gas guide comprising:
   a fabric member having an obverse side, a reverse side, a leading edge, and a trailing edge, the fabric member overlaps upon itself at least once such that at least a portion of the obverse side adjacent the leading edge is disposed to align with at least a portion of the reverse side adjacent the trailing edge to define an overlapping region, the fabric member further comprises a first edge connecting the leading edge and the trailing edge and a second edge connecting the leading edge and the trailing edge, wherein the fabric member overlaps upon itself to form a sleeve having a first opening defined by the first edge and a second opening defined by the second edge; and
   a first seam sewn through or attached to the overlapping region, the first seam being in shear stress when the airbag module is inflated.

2. The textile gas guide of claim 1, wherein the fabric member overlaps upon itself twice or more such that the obverse side adjacent the leading edge is disposed to align with the reverse side adjacent the trailing edge to define a twice overlapped region, the first seam sewn through the twice overlapped region, the first seam being in shear stress when the airbag module is inflated.

3. The textile gas guide of claim 1, wherein the fabric member conically overlaps upon itself to form the sleeve having the first opening and the second opening.

4. The textile gas guide of claim 3, further comprising a second seam pinching the first opening together to divide the first opening into an upper opening and a lower opening such that a channel having a "y" shape is created between the upper opening, the lower opening, and the second opening.

5. The textile gas guide of claim 3, further comprising a third seam closing off the second opening.

6. The textile gas guide of claim 1, wherein the fabric member spirally overlaps upon itself to form a sleeve.

7. An airbag module comprising:
   a textile gas guide, said textile gas guide comprising:
      a fabric member having an obverse side, a reverse side, a leading edge, and a trailing edge, the fabric member overlaps upon itself at least once such that at least a portion of the obverse side adjacent the leading edge is disposed to align with at least a portion of the reverse side adjacent the trailing edge to define an overlapping region, the fabric member further comprises a first edge connecting the leading edge and the trailing edge and a second edge connecting the leading edge and the trailing edge, wherein the fabric member conically overlaps upon itself to form a sleeve having a first opening defined by the first edge and a second opening defined by the second edge; and
      a first seam sewn through or attached to the overlapping region, the first seam being in shear stress when the airbag module is inflated;
   an airbag cushion having an inflation throat, at least a portion of the textile gas guide located within the inflation throat; and
   an inflator nestled within the textile gas guide.

8. The airbag module of claim 7, further comprising a clamp for securing together the textile gas guide, the inflation throat, and the inflator.

9. The airbag module of claim 7, wherein the inflation throat is in a recess generally centrally located proximate a top edge of the airbag cushion when the airbag cushion is in an unfolded state.

10. The airbag module of claim 9, wherein the inflation throat is orientated generally parallel to the top edge of the airbag cushion and extends along or beneath the top edge of the airbag cushion.

11. The airbag module of claim 10, wherein the inflator is inserted through an upper opening of the textile gas guide, the inflator axially aligned with the upper opening of the textile gas guide and with the inflation throat.

12. The airbag module of claim 7, wherein the textile gas guide is tack stitched to the airbag cushion.

13. The inflatable airbag module of claim 7, wherein the airbag cushion is fabricated from a single piece of fabric.

14. A method of sewing a textile gas guide, said method comprising:
   providing a fabric member having an obverse side, a reverse side, a leading edge, and a trailing edge, a first edge, and a second edge;
   overlapping the fabric member upon itself at least once such that at least a portion of the obverse side adjacent the leading edge is disposed to align with at least a portion of the reverse side adjacent the trailing edge to define an overlapping region thereby creating a sleeve having a first opening defined by the first edge and a second opening defined by the second edge; and
   sewing a first seam through the overlapping region, the first seam being in shear stress when the airbag module is inflated.

15. The method of claim 14, wherein overlapping the fabric member upon itself at least once comprises overlapping the fabric member upon itself twice such that the obverse side adjacent the leading edge is disposed to align with the reverse side adjacent the trailing edge to define a twice overlapped region, the first seam sewn through the twice overlapped region, the first seam being in shear stress when the airbag module is inflated.

16. The method of claim 14, wherein the step of overlapping comprises overlapping conically the fabric member upon itself to form the sleeve having the first opening and the second opening.

17. The method of claim 16, further comprising sewing a second seam pinching the first opening together and dividing the first opening into an upper opening and a lower opening.

18. The method of claim 16, further comprising sewing a third seam to close off the second opening.

19. The method of claim 14, wherein overlapping the fabric member upon itself further comprises overlapping spirally the fabric member upon itself to form a sleeve.

* * * * *

UNITED STATES PATENT AND TRADEMARK OFFICE
CERTIFICATE OF CORRECTION

| | | |
|---|---|---|
| PATENT NO. | : 7,883,112 B2 | Page 1 of 1 |
| APPLICATION NO. | : 12/154751 | |
| DATED | : February 8, 2011 | |
| INVENTOR(S) | : Dana Wold et al. | |

It is certified that error appears in the above-identified patent and that said Letters Patent is hereby corrected as shown below:

On the title page,

Please change item [74] Attorney, Agent, or Firm from "Madison IP, P.C." to --Madson IP, P.C.--

In column 1, line 48, please replace "finserted" with --inserted--

In column 14, claim 14, line 27, please replace "edge, and a trailing edge," with --edge, a trailing edge,--

Signed and Sealed this
Fifteenth Day of March, 2011

David J. Kappos
*Director of the United States Patent and Trademark Office*